United States Patent [19]

D'Onofrio et al.

[11] 4,449,075
[45] May 15, 1984

[54] ELECTROLUMINESCENT LAMP DRIVER

[75] Inventors: Anthony D'Onofrio, West Hartford; Jack Gunzy, Bethel, both of Conn.

[73] Assignee: Timex Corporation, Waterbury, Conn.

[21] Appl. No.: 417,779

[22] Filed: Sep. 13, 1982

[51] Int. Cl.³ ............................................. H05B 33/08
[52] U.S. Cl. ................................. 315/169.3; 315/246; 315/290; 340/781
[58] Field of Search .................... 315/169.3, 208, 246, 315/283, 290; 340/781, 811

[56] References Cited

U.S. PATENT DOCUMENTS

| | | | |
|---|---|---|---|
| 3,629,653 | 12/1971 | Irwin | 315/169.3 |
| 4,070,663 | 1/1978 | Kanatani et al. | 340/781 X |
| 4,238,793 | 12/1980 | Hochstrate | 340/781 |
| 4,253,097 | 2/1981 | Hochstrate | 315/169.3 X |

FOREIGN PATENT DOCUMENTS 53-33078  3/1978  Japan ................................ 315/169.3

*Primary Examiner*—Eugene R. LaRoche
*Attorney, Agent, or Firm*—William C. Crutcher; Joseph A. Biela

[57] ABSTRACT

An electroluminescent lamp driver circuit is disclosed, which includes a timer circuit acting as a retriggerable astable multivibrator interfacing with transistor-transistor logic (TTL) circuitry. The timer circuit sets the operating frequency of the entire lamp driver circuit while the TTL circuitry includes a transistor for controlling the operating voltage of the TTL circuit and two additional transistors for providing the switching for periodically exciting the phosphor in the lamp to luminesce.

8 Claims, 1 Drawing Figure

ELECTROLUMINESCENT LAMP DRIVER

BACKGROUND OF THE INVENTION

This invention relates to an imprroved drive circuit for an electroluminescent (EL) cell, panel, or lamp.

Generally, an electroluminescent cell or lamp or panel which is known in the art includes a transparent, electrically conducting front electrode, a thin binder layer of transparent thermoplastic material loaded with an electroluminescent phosphor powder forming a matrix, and a reflecting, electrically conducting back electrode. Light is emitted through the front electrode when an alternating current electric field is applied across the phosphor powder. The electric field which is produced by a driving circuit excites the phosphor to luminesce.

Light output from phosphors in the matrix is composed of individual pulses of light generated at each voltage pulse such that light emission intensity is proportional to the voltage—pulse frequency. U.S. Pat. No. 4,238,793, issued to Hochstrate and assigned to Timex Corporation, discloses a driving circuit for exciting phosphors in EL lamps to luminesce by providing a low duty cycle pulsed high frquency potential. U.S. Pat. No. 4,253,097, issued to Hochstrate and assigned to Timex Corporation, also discloses a drive circuit for activating electroluminescent panels. Both patents are incorporated herein by reference.

A low-voltage, battery-supplied power source for pulse driving a novel electroluminescent lamp is discussed in copending U.S. patent application, Ser. No. 362,708, filed on Mar. 29, 1982. The drive circuit includes an oscillator for periodically providing an alternating electric field to excite the phosphor in the EL lamp to luminesce. The oscillator in the pending patent application provides low duty cycle pulses of less than 25 percent at a predetermined high frequency to a switch which includes two transistors. The switch produces an output pulse while it is "on" for the duration of each pulse waveform produced by the oscillator. The switch turns "on" an inductor for the duration of each switch output pulse. The energy that builds up in the field of the inductor when it is "on" is applied across the EL lamp in the manner described in the pending application in order to excite the phosphor to luminesce.

The 555 integrated circuit timer developed by Signetics, Inc. is a new generation of timer chips having, as an important characteristic, frequency and period stability. In other words, it does not change parameters merely because the supply voltage drops. The 555 uses the ratio of its supply voltage and certain of its IC terminal voltages so that, for example, the threshold potential is a fraction of the supply voltage.

The 555 may be used as a variable duty cycle astable multivibrator. Generally, the duty cycle, or duty factor, of an astable multivibrator relates the total HIGH (maximum such as +5 volts) output value to the total LOW (zero) output value. In the 555 astable circuit, the duty cycle is set by the two resistors in the frequency setting network portion of the circuit. By varying the ratio of the two resistors, the duty factor is easily changed.

The 555 can be made to interface with TTL, bipolar or CMOS families of IC logic circuits. The timing network (resistors and capacitor) in the 555 sets the operating frequency, the frequency setting network (resistors) sets the duty cycle and the supply voltage potential sets the amplitude of the 555 output signal. Additional aspects of the 555 timer are discussed in such texts as the "Guide To CMOS Circuits" by Howard M. Berlin, published by Howard W. Sams & Co., Inc., Indianapolis, Ind. (1979).

SUMMARY OF THE INVENTION

A driver circuit is disclosed for driving an electroluminescent lamp which includes a timer circuit and a logic circuit. The timer circuit includes a predetermined threshold voltage level and a predetermined control voltage level where the threshold level is less than the control level. The threshold level and control level have magnitudes which are a function of the maximum power supply voltage. The timer circuit periodically produces either a LOW level voltage signal, below threshold voltage level, or a HIGH level voltage signal, above control voltage level, in response to either a HIGH level voltage signal or a LOW level voltage signal, respectively. The logic circuit includes a first transistor which controls the magnitude of the logic circuit operating voltage and second and third transistors. The second transistor periodically turns off or on in response to the LOW and HIGH level voltage signals periodically produced by the timer circuit while, in response to the first and second transistors, the third transistor periodically turns on or off, respectfully, in order to drive the electroluminescent lamp.

DESCRIPTION OF PREFERRED EMBODIMENT

Figure 1:
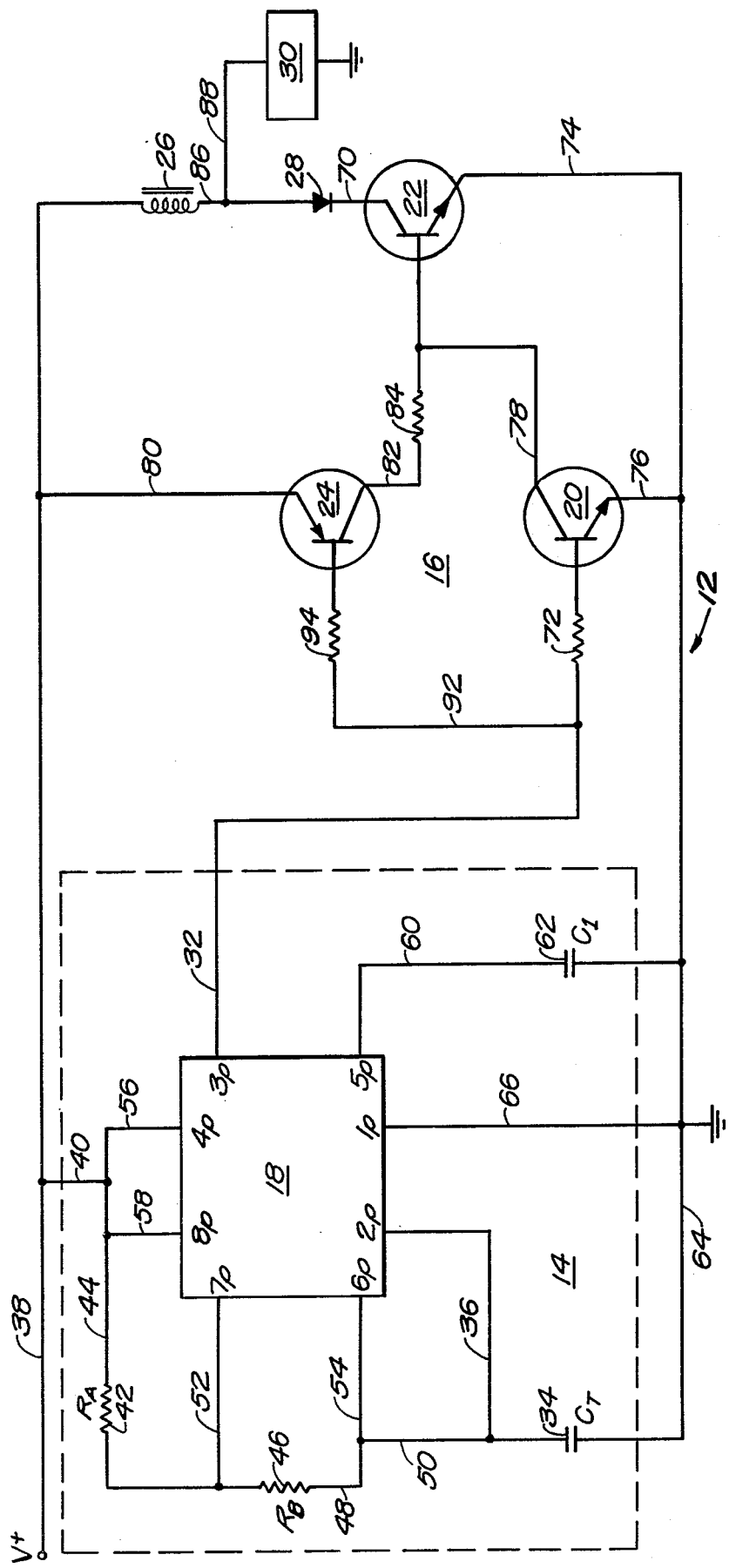
FIG. 1 is a circuit diagram of the electroluminescent lamp driver circuit of the present invention.

Electroluminescent (EL) lamp driver circuit 12 is shown in FIG. 1 including timer circuit 14 and TTL (transistor-transistor logic) circuit 16. Timer circuit 14 includes timer 18 configured as an astable multivibrator in a manner known in the art and briefly described below. TTL circuit 16 includes first transistor 20, second transistor 22, and third transistor 24 which are interconnected as described below. Of course, logic circuit 16 could be implemented with other logic circuit elements including low power, Schottky, low-power Schottky, or high power transistors which trade off power consumption and speed. Included in driver circuit 12 and connected to the output of TTL circuit 16 is inductor 26 and diode 28. Driver circuit 12 is provided for driving electroluminescent lamp 30 to luminesce. Lamp 30 luminesces in accordance with known principles of electroluminescent lamp theory and technology.

Timer 18, in this embodiment, is an 8-pin IC device known in the art as the 555 timer which was developed by Signetics, Inc. The 555 can be operated with a voltage supply potential, V+, of from +4.5 to +15 volts DC. Of course, other retriggerable one-shot circuits or multivibrators may be implemented in the present embodiment to provide the overall oscillatory function of the 555. Also, TTL or CMOS gates or inverter circuits may be used as the active circuit elements.

The 8-pin timer includes a ground pin 1p, a trigger input pin 2p, an output pin 3p, a reset input pin 4p, a control voltage pin 5p, a threshold voltage pin 6p, a discharge pin 7p, and auxilliary input pin 8p.

The timer is implemented as a one-shot astable circuit that retriggers itself after the output pulse provided on line 32 times out. Specifically, the timer of FIG. 1 is connected as a pulse producing astable multivibrator in which trigger input pin 2p is connected across timing capacitor 34 via line 36 in order to control the retriggering of the timer. The timer or multivibrator will retrigger when (1) power (V+) from a voltage power supply (not shown) is initially applied along lines 38 and 40, and (2) every time the device times out and the charge on capacitor 34 is dumped through discharge transistor (not shown), internal to the timer, at discharge pin 7p.

Capacitor 34, $C_T$, is charged, by the application of supply voltage V+ to line 38, through resistor 42, $R_A$, in line 44 and resistor 46, $R_B$, in line 48, but is only discharged along line 50 through resistor 46 in line 48 to pin 7p along line 52. This makes the LOW state of the output signal on line 32 shorter in time duration than the HIGH state. These time periods in the LOW and HIGH states are given by the following expressions:

$$t_{LOW} = 0.693(R_B)C_T$$

$$t_{HIGH} = 0.693(R_A + R_B)C_T$$

The total time period, T, for the output signal is the sum of the HIGH and LOW time for each cycle or:

$$T = t_{LOW} + t_{HIGH} = 0.693(R_A + 2R_B)C_T$$

When capacitor 34 charges to a HIGH voltage level, which, in this case, is a voltage potential greater than ⅔ (V+), the output pulse on line 32 goes LOW, which in this case, is a voltage potential less than ⅓ (V+). This causes capacitor 34 to discharge through resistor 46. When the voltage across capacitor 34 drops below a threshold voltage level, i.e., ⅓ (V+), or trigger point provided to threshold voltage pin 6p on line 54, the timer, performing as a multivibrator, will retrigger and output pulse production will be repeated along line 32.

The reset input (pin 4p) is normally activated with a LOW input signal. Therefore pin 4p is tied to power line 38 via lines 56 and 40 in order to disable the reset input at pin 4p. Auxillary input pin 8p is also tied to power line 38 via lines 58 and 40.

The timer control voltage, ⅔ (V+), is provided along line 60 to pin 5p due to the charge on capacitor 62 which is tied to ground line 64 which is at ground potential level.

Ground pin 1p is connected directly to ground line 64 via line 66 and the side of capacitor 34 distal to discharge line 50 is also connected to grounded line 64.

In summary, when power (V+) is first applied on line 38 to the timer/multivibrator, the voltage across capacitor 34 rises slowly at a rate determined by $(R_A + R_B)C_T$. The trigger input at pin 2p "sees", initially, the voltage potential of capacitor 34 as being less than the threshold voltage level. Capacitor 34 will continue to charge until its voltage reaches the control voltage, ⅔ (V+), level. The discharge transistor internal to the timer is turned on and, since it is connected between resistors 42 and 46 via line 52 to pin 7p, the charge on capacitor 34 is discharged through resistor 46. The rate of decay of the voltage across capacitor 34 is determined by time constant $R_B C_T$.

The voltage across capacitor 34 continues to decay until it drops below the threshold voltage level provided at pin 6p via line 54. Since the voltage across capacitor 34 varies between ⅔ (V+) and ⅓ (V+) voltage levels, the output of the timer flips back and forth between HIGH and LOW voltages states.

The duty cycle of the timer/multivibrator is the ratio of the HIGH to the LOW times. However, since the HIGH and LOW times are unequal, the duty cycle is expressed in percent as:

$$(R_A + R_B)/(R_A + 2R_B)$$

By making $R_B$ very large with respect to $R_A$, the duty cycle can be made to approach 50 percent.

The timer circuit 14 was made to interface timer 18 with TTL circuitry 16. As previously described, resistors 42 and 46 and capacitor 34 set the operating frequency of the EL lamp driver circuit 12. The output signal amplitude on line 32, however, depends upon the power supply potential V+ on line 38.

In practice, virtually any supply voltage potential may be applied to line 38 since the output signal that actually drives the TTL circuit operates from, typically, +5 volts D. C. The operating voltage for the TTL portion of driver circuit 12 is controlled by voltage reference (third) transistor 24. First and second transistors, 20 and 22, are used to provide an output signal on line 70 that is in phase with the timer output signal on line 32 which is applied to the base of transistor 20 via line 90 through resistor 72. The emitter of transistor 20 is tied to ground line 64 via line 76. The emitter of transistor 22 is tied to ground line 64 via line 74. Transistor 22 has relatively high voltage-handling characteristics as high as approximately 1500 volts.

When the output signal of timer 18 on line 32 is LOW, transistor 20 turns off. No current flows into the collector of transistor 20. Therefore, the potential applied to the base of transistor 22 turning it on is provided by transistor 24 on line 82 via resistor 84 as described below. The effect of turning transistor 22 on is to cause the potential at its collector to be LOW.

When the output signal of timer 18 on line 34 is HIGH, transistor 20 is forward biased and turns on. The collector voltage of transistor 20 decreases thereby removing the bias applied to transistor 22 on line 78. Transistor 22 turns off and its collector voltage rises to a HIGH potential level.

When the output signal of timer 18 applied to transistor 24 via lines 32 and 92 and resistor 94 is LOW, transistor 24 is forward biased at its emitter due to the voltage potential V+ provided to it on lines 38 and 80. However, the collector-base voltage of transistor 24 is reversed biased thereby permitting current to flow from the collector to the base of transistor 22 via line 82 through resistor 84. This base current turns transistor 22 on. When transistor 22 is on, its collector potential is LOW. This permits the build-up of energy in the field of inductor 26. Diode 28 in line 70 prevents leakage current from occurring during the discharge of energy in the field of the inductor.

When the output signal of timer 18 on line 32 is HIGH, for example, +5 volts, transistor 24 is reversed biased at its emitter and no current is permitted to flow from its collector to the base of transistor 22. Transistor 22 is turned off since the collector voltage of transistor 20 is reduced substantially to zero. As a result, the collector voltage of transistor 22 rises rapidly to a potential level as high as approximately +500 volts. This permits the energy in the field of inductor 26 to be applied across EL lamp 30 via lines 86 and 88 in a manner known in the art.

Transistor 20 insures that transistor 22 is switched off rapidly within approximately one microsecond (quicker than would otherwise be the case if transistor 20 were not part of TTL circuitry 16) so that the transition time for which the voltage in the inductor is provided across the EL cell is short (efficient interchange of energy between inductor 26 and EL cell) 30 producing an optimal resonance condition than would otherwise be the case if transistor 20 was not implemented). The energy in the field of the inductor is produced by the high voltage generated by the inductor (as high as approximately 1500 volts and higher) which is a function of the change in current in the inductor with respect to time. The change of current with respect to time is affected by the time required for transistor 22 to switch on and off. Specificaly, the longer the switching time, the lower the rate of change of current with respect to time in the inductor and, therefore, the lower the inductor voltage. The lower the inductor voltage, the lower the energy in the field of the inductor. In essence, transistor 20 is provided to insure an optimal interchange of energy between the inductor and the EL lamp.

When the lamp is driven continuously, the energy in the field of the inductor is applied across the lamp at a frequency which is controlled by timer circuit 14 in the manner previously described.

The inductor and EL lamp or cell form an inductor-capacitor circuit such that as the energy in the field of the inductor is applied across the cell, an interchange of energy occurs between the inductor and the cell which is similar to and descriptive of the well-known action of a inductor-capacitor "tank circuit" at resonant frequency. The frequency of energy interchange will depend, at least in part, upon the amount of energy developed in the field of inductor 26 and upon the size of EL cell 30. Substantially, any size cell can be driven to luminesce using drive circuit 12 and the same size inductor 26 although the brightness or light intensity will vary.

Timer circuit 14 sets the duty cycle and operating frequency or repetition rate for periodically charging the inductor. The duty cycle and operating frequency establish the amount of energy periodically provided to illuminate the lamp, i.e. by providing a low duty cycle pulsed high frequency potential to the inductor. However, once the energy has built up in the field of the inductor sufficient to illuminate the lamp and transistor 22 in TTL circuit 16 is turned off, the resonance effect produced by the parallel combination of inductor 26 and lamp 30 is solely determined by the size of the lamp, i.e. by its capacitance. The lamp capacitance shifts the "resonant" frequency depending upon its size. Nevertheless, as long as the low duty cycle pulsed potential is sufficiently high, timer circuit 14 together with TTL circuit 16 (lamp driver circuit 12) can drive different sizes of EL lamps without adjusting any component of the lamp driver circuit. The duty cycle may be as high as 100:1 ratio and the pulse repetition rate may be 2 kHz.

The driver circuit is capable of repetitively obtaining 3,000 volts (peak-to-peak) from a 6 volt D.C. power supply. Each repetitive pulse is an exponentially decaying 20 kHz sine wave that excited the EL lamp to luminesce.

What is claimed is:

1. A driver circuit for driving an electroluminescent lamp including voltage power supply means and an inductor electrically connected to said lamp, said driver circuit comprising:
    (a) timer circuit means for periodically producing a LOW level voltage signal lower in magnitude than a predetermined threshold voltage level in response to a HIGH level voltage signal provided by said power supply means greater in magnitude than a predetermined control voltage level and for periodically producing a HIGH level voltage signal in response to a LOW level voltage signal, and
    (b) logic circuit means including a first logic circuit element for controlling the magnitude of the operating voltage produced by said voltage power supply means that drives said logic circuit means, a second logic circuit element which periodically turns off and on in response to said HIGH and LOW voltage signals periodically produced by said timer circuit means and a third logic circuit element which periodically turns on and off in response to said first and second logic circuit elements for providing the switching for periodically producing energy in the field of said inductor to periodically excite said lamp to luminesce due to interchange of energy between said inductor and said lamp.

2. The driver circuit of claim 1 in which said second logic means provides for the rapid on and off switching of said third logic means to produce a short transition time in which said lamp is excited to luminesce.

3. The driver circuit of claim 1 further including a frequency setting network.

4. The driver circuit of claim 3 in which said frequency setting network includes electrical resistor elements having magnitudes the predetermined ratio of which establish the percent duty cycle and repetition rate of said driver circuit.

5. The driver circuit of claim 4 in which said percent duty cycle is changed by changing the magnitude of said resistor elements.

6. The driver circuit of claim 1 in which said third logic circuit element produces an output signal which is in phase with the output signal provided by said timer circuit means.

7. The driver circuit of claim 1 or 2 in which second logic means provides for efficient interchange of energy between said inductor and said electroluminescent lamp.

8. The driver circuit of claim 2 in which said short transition time is less than 1 microsecond.

* * * * *